(12) United States Patent
Grimm et al.

(10) Patent No.: US 7,819,638 B2
(45) Date of Patent: Oct. 26, 2010

(54) COMPRESSOR MOUNTING SYSTEM

(75) Inventors: Mark Thomas Grimm, Dunlap, IL (US); Ryan Patrick McEnaney, Peoria, IL (US); Danette E. Hadfield, Low Point, IL (US)

(73) Assignee: Caterpillar Inc, Peoria, IL (US)

( * ) Notice: Subject to any disclaimer, the term of this patent is extended or adjusted under 35 U.S.C. 154(b) by 1306 days.

(21) Appl. No.: 10/952,722

(22) Filed: Sep. 30, 2004

(65) Prior Publication Data

US 2006/0067838 A1 Mar. 30, 2006

(51) Int. Cl.
*F04B 17/00* (2006.01)
*F04B 35/00* (2006.01)

(52) U.S. Cl. .................. 417/363; 248/603; 248/675

(58) Field of Classification Search .................. 417/363; 248/674, 675, 638, 667, 603, 666
See application file for complete search history.

(56) References Cited

U.S. PATENT DOCUMENTS

| | | | |
|---|---|---|---|
| 3,030,056 A | 4/1962 | Rogers | |
| 3,041,023 A * | 6/1962 | Odlum et al. | ............... 248/666 |
| 3,465,954 A | 9/1969 | Ellis | |
| 3,578,279 A | 5/1971 | Scheldorf | |
| 4,549,859 A | 10/1985 | Andrione et al. | |
| 4,676,473 A | 6/1987 | Giles | |
| 4,858,880 A * | 8/1989 | Durand | ....................... 248/635 |
| 5,342,179 A | 8/1994 | Dreiman | |
| 5,810,322 A | 9/1998 | Zhao et al. | |
| 5,842,677 A | 12/1998 | Sweeney et al. | |
| 6,003,897 A * | 12/1999 | Dostert et al. | ............... 280/781 |
| 6,004,113 A | 12/1999 | Vay | |
| 6,041,618 A | 3/2000 | Patel et al. | |
| 6,132,183 A * | 10/2000 | Li et al. | ....................... 417/363 |
| 6,234,445 B1 * | 5/2001 | Yoon | ........................... 248/638 |
| 6,543,741 B1 | 4/2003 | Li et al. | |
| 6,931,884 B2 * | 8/2005 | Kolda et al. | ................... 62/449 |

FOREIGN PATENT DOCUMENTS

AU 743743 2/2002

* cited by examiner

*Primary Examiner*—Devon C Kramer
*Assistant Examiner*—Peter J Bertheaud
(74) *Attorney, Agent, or Firm*—Finnegan, Henderson, Farabow, Garrett & Dunner LLC

(57) ABSTRACT

A mounting system is provided for supporting a weight of a compressor in a mobile application. The compressor may include a top end and a bottom end. The mounting system may include a housing having a top plate and a bottom plate, the top plate being disposed a distance above the bottom plate. A mounting bracket may be connected to the top plate and the bottom plate. An isolation assembly may be disposed on the mounting bracket and may be configured to connect to the compressor at a connecting location below the top end and above a location at or adjacent to the bottom end of the compressor. The isolation assembly is configured to support the weight of the compressor at the connecting location without the compressor being supported adjacent to its bottom end.

20 Claims, 5 Drawing Sheets

COMPRESSOR MOUNTING SYSTEM

TECHNICAL FIELD

This disclosure is directed to a mounting system for a compressor and, more particularly, to a mounting system for a compressor in a mobile application.

BACKGROUND

Compressors used in air-conditioning and heat pump systems are typically mounted to an associated base plate through a vibration isolating mounting assembly. A typical vibration isolating mounting assembly includes elastomeric grommets disposed at the base of the compressor. These elastomeric grommets may act as feet for the compressor, maintaining the compressor above the base plate. The grommets support the weight of the compressor from its bottom and are spaced to prevent tipping. Further, the grommets vibrationally and acoustically isolate the compressor from the base plate. In such a mounting arrangement, resonance frequencies of the compressor may be inherently high and may tend to fall within the proximity of the compressor speed, thereby causing vibration and noise problems. When used in a mobile environment, such as on a vehicle, the problems of vibration and noise may be exacerbated by engine and road vibration.

One system for addressing the vibration of a compressor is disclosed in U.S. Pat. No. 6,128,183 to Li et al. (the '183 patent). The '183 patent discloses a compressor stabilizing mount that includes a base support and isolator supports. The base support is disposed directly beneath the compressor, while the isolator supports extend along the side of the compressor. The base support carries most, if not all, of the weight of the compressor. The side isolators support little, if any, of the compressor weight, but serve to resist tipping and torsional movement of the compressor. Although the system disclosed in the '183 patent prevents the compressor from tipping, it may not provide a viable solution to the extra vibration and forces applied to the compressor when used in a mobile environment.

The present disclosure provides a compressor mounting system directed to overcoming one or more of the shortcomings of the currently available systems.

SUMMARY OF THE INVENTION

In one exemplary aspect, this disclosure is directed to a mounting system for supporting a weight of a compressor in a mobile application. The compressor may include a top end and a bottom end. The mounting system may include a housing having a top plate and a bottom plate, the top plate being disposed a distance above the bottom plate. A mounting bracket may be connected to the top plate and the bottom plate. An isolation assembly disposed on the mounting bracket and configured to connect to the compressor at a connecting location below the top end and above a location at or adjacent to the bottom end of the compressor. The isolation assembly may be configured to support the weight of the compressor at the connecting location without the compressor being supported at an end adjacent to its bottom end.

In another exemplary aspect, this disclosure is directed to a compressor assembly for supporting a weight of a compressor. The compressor assembly includes a compressor having a top end, a bottom end, a shell surface, and a longitudinal axis extending through the top and bottom ends. A mounting system is in contact with the shell surface of the compressor at a connecting location below the top end and above locations at or adjacent to the bottom end of the compressor. The mounting system is configured to support the weight of the compressor at the connecting location without the compressor being supported at an end adjacent to its bottom end.

DETAILED DESCRIPTION

Reference will now be made in detail to embodiments of the present invention, examples of which are illustrated in the accompanying drawings. Wherever possible, the same reference numbers will be used throughout the drawings to refer to the same or like parts.

Figure 1:
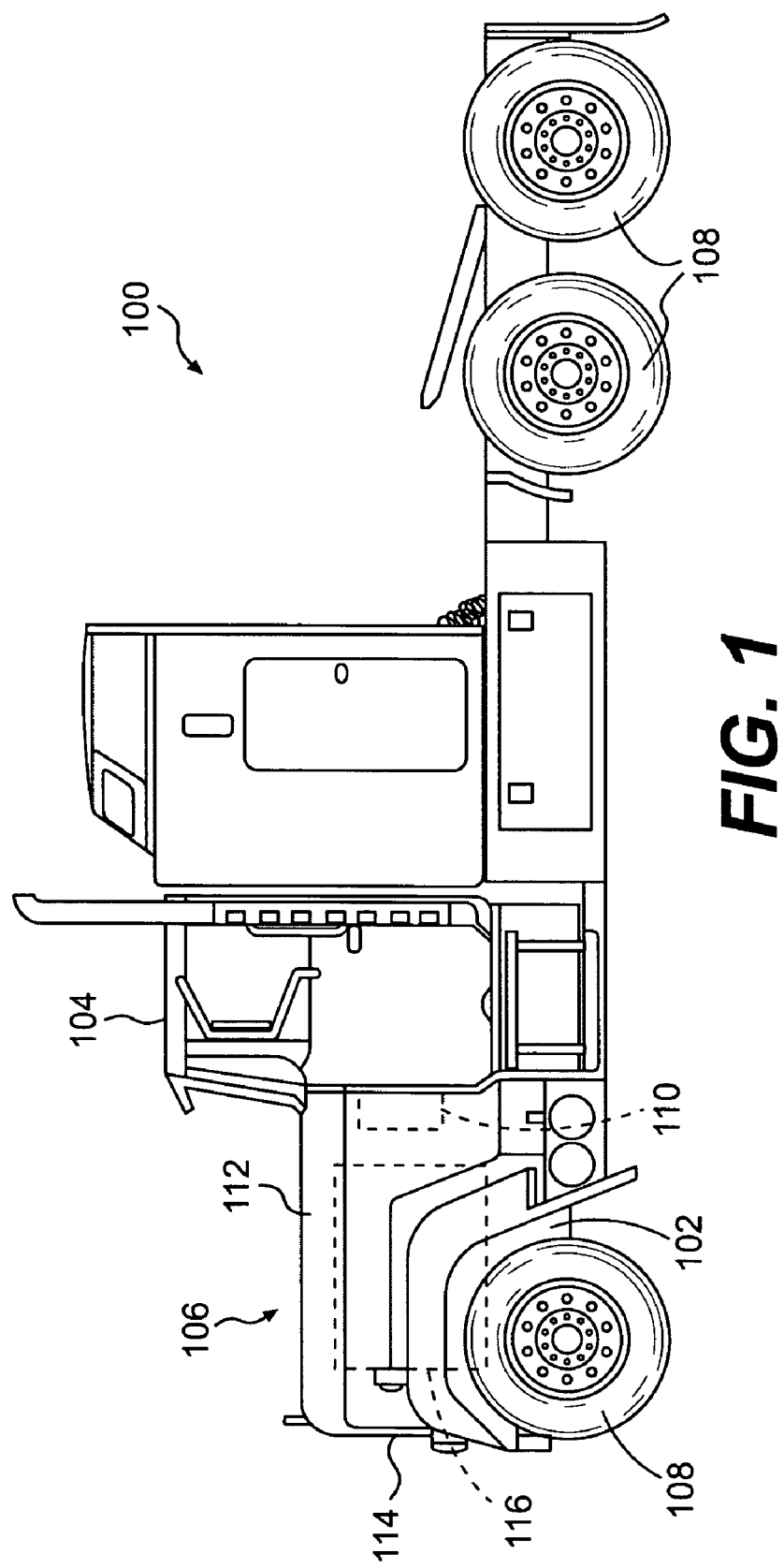
FIG. 1 is a pictorial representation of an exemplary vehicle.

An exemplary embodiment of an on-highway vehicle 100 is illustrated in FIG. 1. Although the vehicle 100 is shown as an on-highway truck, it could be an off-highway truck or other vehicle. In the exemplary embodiment shown, the vehicle 100 includes a frame 102, an operator compartment 104, a propulsion system housing 106, wheels 108, and a compressor assembly 110. The frame 102 may support the operator compartment 104 and the propulsion system housing 106, which in turn, may itself be supported by the wheels 108.

The propulsion system housing 106 may include a hood 112 and a grill 114. An engine 116 and/or other driving components may be contained within the propulsion system housing 106, supported on the frame 102, and may provide power to drive the wheels 108.

The compressor assembly 110 may be disposed in any convenient location on the work machine 100 but, in this exemplary embodiment, is shown as being contained below the hood 112 within the propulsion system housing 106, adjacent the operator compartment 104. The compressor assembly 110 may be an air-conditioning compressor designed to compress a vapor or liquid refrigerant as part of an air-conditioning system that may provide air-conditioned airflow to the operator compartment 104.

Figure 2:
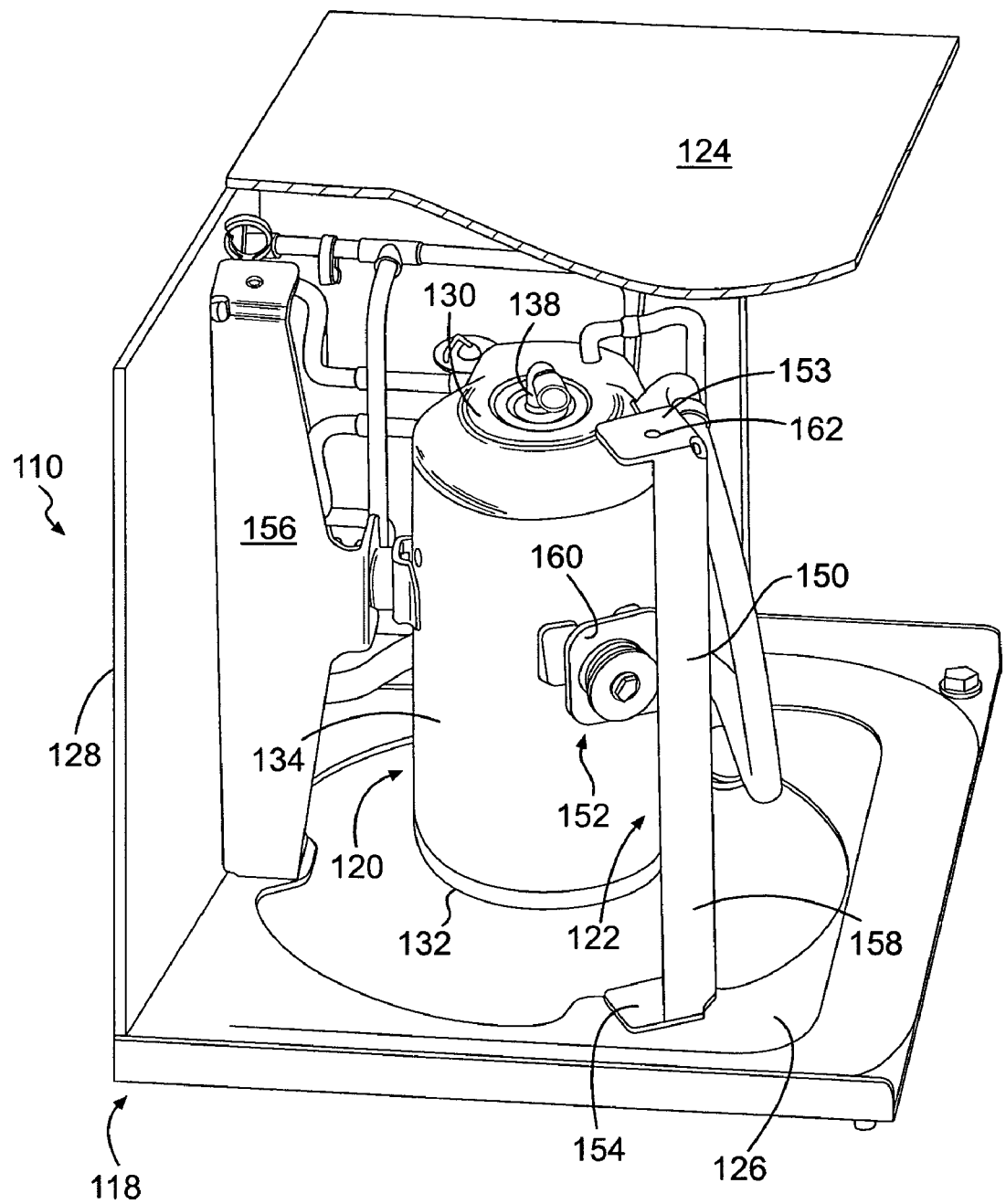
FIG. 2 is a pictorial representation of an exemplary compressor assembly.

FIG. 2 shows the compressor assembly 110 in greater detail. The compressor assembly 110 includes a compressor housing 118, a compressor 120, and a mounting system 122. The compressor housing 118 may include a top plate 124, a bottom plate 126, and one or more side walls 128. The top and bottom plates 124, 126, along with the side walls 128, may join together to form a container for the compressor 120. The top plate 124 may be removably secured to the side walls 128, thereby providing interior access to the housing 118. The bottom plate 126 may be configured to support the compressor 120, thereby providing stability. The side walls 128 extend between and connect the top and bottom plates 124, 126. Although only one side wall 128 is shown, it should be readily apparent that more side walls may be used to enclose the compressor 120. The compressor housing 118 may include acoustical linings (not shown) or other features that may assist in dampening the noise and/or vibration within the compressor housing 118.

The compressor 120 is shown in cross-section in FIG. 3, and will be described with reference to both FIGS. 2 and 3. The compressor 120, disposed within the compressor housing 118, may include a first or top end 130, a second or bottom end 132, a shell surface 134, and a longitudinal axis 136 extending through the top and bottom ends 130, 132. The shell surface 134 extends between the top end 130 and the bottom end 132.

In one exemplary embodiment, the compressor 120 is a scroll-type compressor and may be electrically powered. Accordingly, when used in a mobile environment, such as on a vehicle, the compressor 120 may be driven by electrical components rather than being belt driven by the engine 116.

Pipe connectors 138 may be disposed in the top or bottom ends 130, 132 and may allow refrigerant within the compressor 120 to flow to additional components, such as a heat-pump, typical in an air-conditioning system. In this exemplary embodiment, the pipe connectors 138 are shown exiting the top end 130. However, it should be noted that the pipe connectors 138 may also exit the bottom end 132 and/or the shell surface 134.

The compressor 120 includes a center of gravity identified by reference numeral 140. As shown in FIG. 3, the center of gravity 140 may be disposed along the longitudinal axis 136 that runs centrally through the compressor 120. The center of gravity 140 is a point at which the entire weight of a body may be considered as concentrated, and its location may be determined using well-known principles for a specified compressor.

The mounting system 122 includes a mounting bracket 150 and an isolation assembly 152. The mounting bracket 150 and isolation assembly 152 are configured to connect and the support the compressor 120 in the compressor housing 118. Further, the mounting bracket 150 and isolation assembly 152 may be configured to support substantially the complete weight of the compressor 120, so that weight of the compressor 120 need not be supported at its bottom end 132 or locations adjacent its bottom end 132. FIG. 3 shows a cross-sectional view of the mounting system 122. Accordingly, the mounting system 122, like the compressor 120, will be described with reference to both FIGS. 2 and 3.

The mounting bracket 150 may provide structural integrity to support the weight of the compressor 120. It may be formed of any sufficiently strong material, including a sheet or molded material. The mounting bracket 150 may include a top foot 153, a bottom foot 154, a rib 156, a back face 158 and a mount face 160.

In this exemplary embodiment, the top foot 153 and the bottom foot 154 define top and bottom ends, respectively, of the mounting bracket 150. The top and bottom feet 153, 154 may be formed by bending a portion of the sheet material forming the mounting bracket 150 to provide a surface that is substantially parallel to the top and bottom plates 124, 126. The mounting bracket 150 may be sized to extend from the top plate 124 to the bottom plate 126 of the compressor housing 118, so that the top and bottom feet 153, 154 may contact and attach to the top and bottom plates 124, 126, respectively. For connection to the top plate 124, the top foot 153 may include a fastening hole 162 configured to receive a bolt or other fastener. The bottom foot 154 may be welded to the bottom plate 126. It should be noted, however, that either of the top or bottom feet 153, 154 may connect to the top or bottom plates 124, 126 using any known attachment system.

The sheet material forming the rib 156 may be aligned so that a plane (not shown) formed along the rib 156 would intersect the compressor 118 and may extend from the top foot 153 to the bottom foot 154 and from the mount face 160 to the back face 158. Front edges 164 of the rib 156 may taper from the top and bottom feet 153, 154 to the mount face 160. The back face 158 may extend from the rib 156 to form an L-shape and may help prevent deformation of the rib 156.

The mount face 160, like the back face 158, may be formed by bending the sheet material of the mounting bracket 150 so that the mount face 160 and the rib 156 form an L-shape. Accordingly, the mount face 160, the rib 156, and the back face 158 may form a C-shape. As shown in FIGS. 2 and 3, the mount face 160 is adjacent or disposed at about the same height as the center of gravity 140 of the compressor 120.

Figure 4:
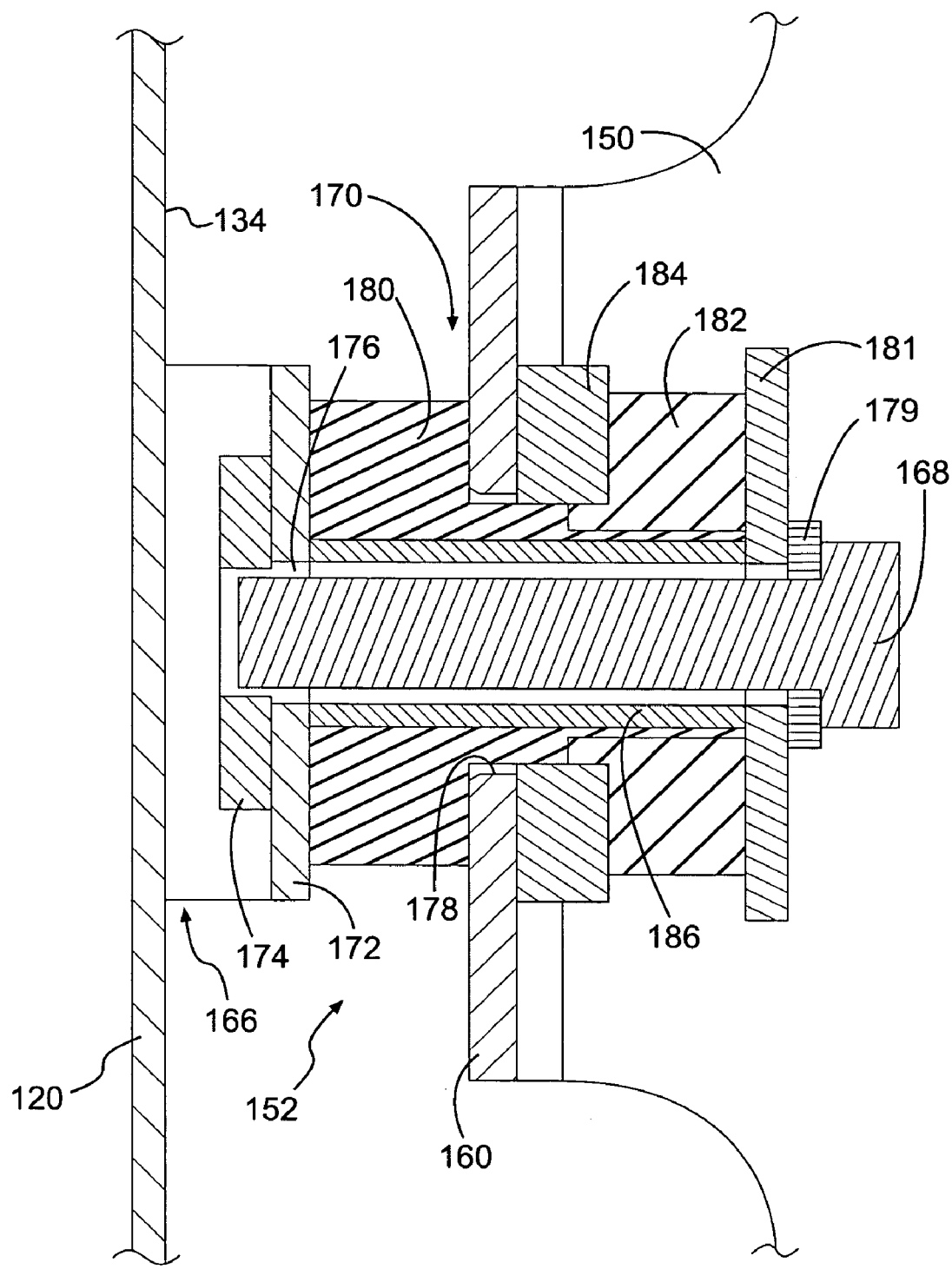
FIG. 4 is a pictorial cross-sectional view showing detail of a portion of the compressor assembly of FIG. 2.

The isolation assembly 152 connects the mounting bracket 150 to the compressor 120 at a connection point and may be configured to support the full weight of the compressor 120. The isolation assembly 152 is disclosed in greater detail with reference to FIG. 4. As shown in FIG. 4, the isolation assembly 152 includes a compressor fastener 166, a securing fastener 168, and an isolator bushing 170. The compressor fastener 166 may be connected to the compressor shell surface 134 and may be configured to selectively connect and disconnect to other components of the isolation assembly 152, such as the securing fastener 168. In the exemplary embodiment shown, the compressor fastener 166 is a weld nut formed of a plate 172 secured to the shell surface 134 and a threaded nut 174 secured to the plate 172. In this embodiment, the plate 172 includes a receiving hole 176 formed therein, allowing the securing fastener 168 to pass through the plate 172 to the threaded nut 174.

The securing fastener 168 may fasten the mount face 160 of the mounting bracket 150 to the compressor fastener 166. In one exemplary embodiment, the securing fastener 168 extends through a receiving hole 178 in the mount face 160 and into the receiving hole 176 of the compressor fastener 166. In one exemplary embodiment, the securing fastener 168 is a threaded bolt that may be threaded into the receiving hole 176 of the compressor fastener 166. First and second flat washers 179, 181 may be associated with the securing fastener 168 to assist in compressing the isolator bushing 170 when the securing fastener 168 is fastened and/or tightened.

The isolator bushing 170 may be an elastomeric component and may include a first portion 180 and a second portion 182, with the first portion 180 disposed between the compressor fastener 166 and the mount face 160. The first portion 180 of the isolator bushing 170 may be configured to receive the securing fastener 168 and also fit between the securing fastener 168 and the mount face 160 by extending into or through the receiving hole 178 in the mount face 160. In this manner, the first portion 180 of the isolator bushing 170 may be disposed in a manner that the compressor fastener 166 and the securing fastener 168 are isolated from the mount face 160 so that vibration from the mount face 160 may be absorbed by the isolator bushing 170 and may dampen vibrations to or from the compressor 120. The second portion 182 of the isolator bushing 170 may be disposed between the second flat washer 181 and the mount face 160 to provide additional dampening.

In the exemplary embodiment shown, a spacer 184 is attached to the mount face 160 to provide additional integrity and robustness to the mount face 160. In addition, a collar 186 extends between the securing fastener 168 and the isolator bushing 170. The collar 186 ensures that the first and second portions 180, 182 of the isolator bushing 170 are maintained a distance away from the securing fastener 168, thereby allowing the securing fastener 168 to be tightened or loosened without wearing the first and second portions 180, 182 of the isolator bushing 170.

In another exemplary embodiment (not shown), the isolation assembly 152 may include posts extending radially outward from the shell surface 134 and may be secured into the receiving hole 178 in the mount face 160. An isolator bushing may extend around the posts to provide vibration dampening.

The isolation assembly 152 is disposed on the mounting bracket 150 so that the mounting system 122 is configured to connect to the compressor 120 at a connecting location below the top end 130 and above locations at or adjacent to the bottom end 132 of the compressor 120. The mounting system 122 may be configured to support the weight of the compressor 120 at the connecting location, such that the weight of the compressor 120 need not be supported at locations at or adjacent to the bottom end 132.

Figure 3:
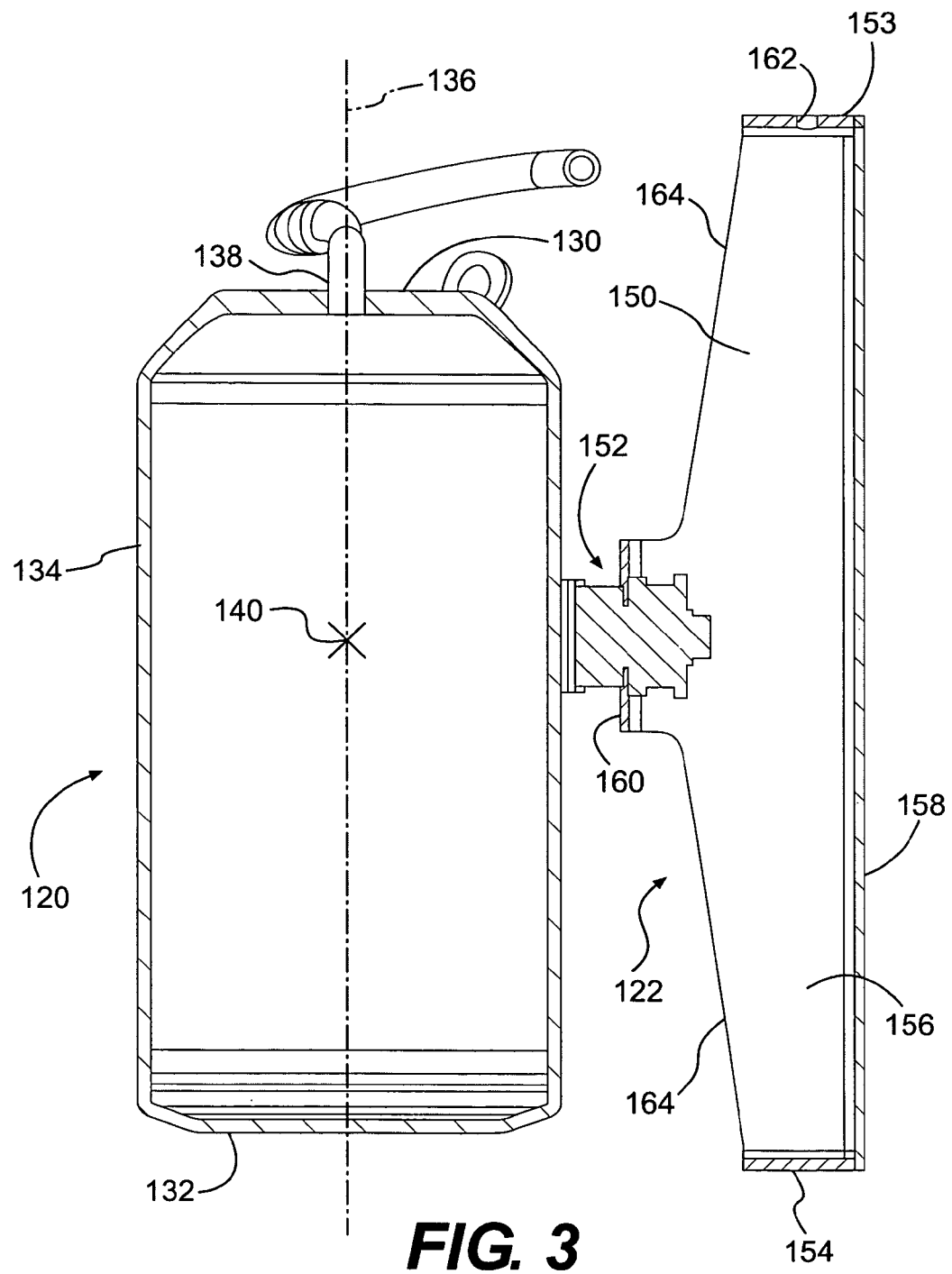
FIG. 3 is a pictorial cross-sectional view of the compressor assembly of FIG. 2.

In the exemplary embodiment disclosed in FIG. 3, the mount face 160 and the isolation assembly 152 connect to the compressor 120 at a height on the compressor 120 that generally corresponds with its center of gravity 140. In another exemplary embodiment, the isolation assembly 152 may connect to the compressor 120 at a height that generally corresponds to a midpoint of the compressor 120. It should be noted that the isolation assembly 152 may connect to the compressor 120 at locations above or below the center of gravity 140 and midpoint of the compressor 120. In each of these embodiments, however, the mounting bracket 150 and isolation assembly 152 do not support the weight of the compressor 120 from its bottom end 132. In addition, the mounting bracket 150 and isolation assembly 152 do not connect to the shell surface 134 at a location adjacent to the bottom end 132. Accordingly, the bottom end 132 of the compressor 120 and locations adjacent the bottom end 132 are unsupported directly, but are suspended from above by the isolation assembly 152. It should be noted the bottom end 132 may include pipe connectors and/or other connectors, but that such connectors are not intended to support any significant amount of weight.

In the exemplary embodiment shown, the compressor assembly 110 includes three mounting systems 122 equally spaced about the compressor 120. However, it should be noted that any number of mounting systems 122 may be used to support the weight of the compressor 120. Irrespective of the number of mounting systems 122 disposed about the compressor 120, the mounting systems 122 may be equally spaced to provide equal dampening and equal support. It is also contemplated that mounting systems 122 may be irregularly spaced to accommodate the specific needs of a compressor application.

Figure 5:
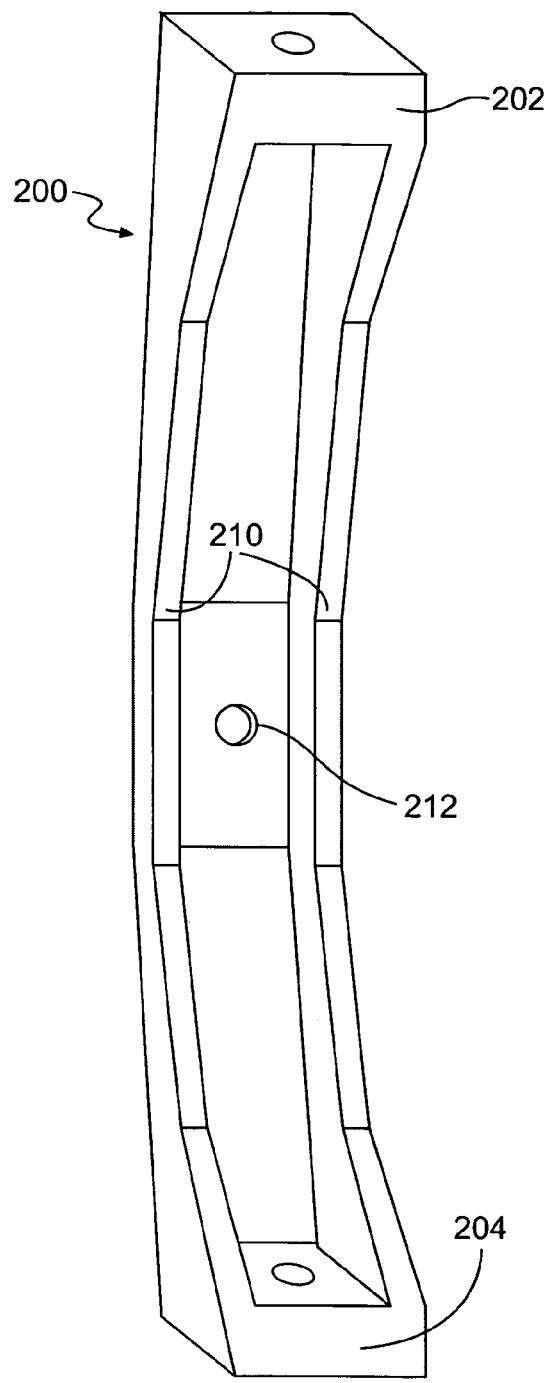
FIG. 5 is a pictorial isometric view of a second exemplary embodiment of a mounting bracket.
Figure 6:
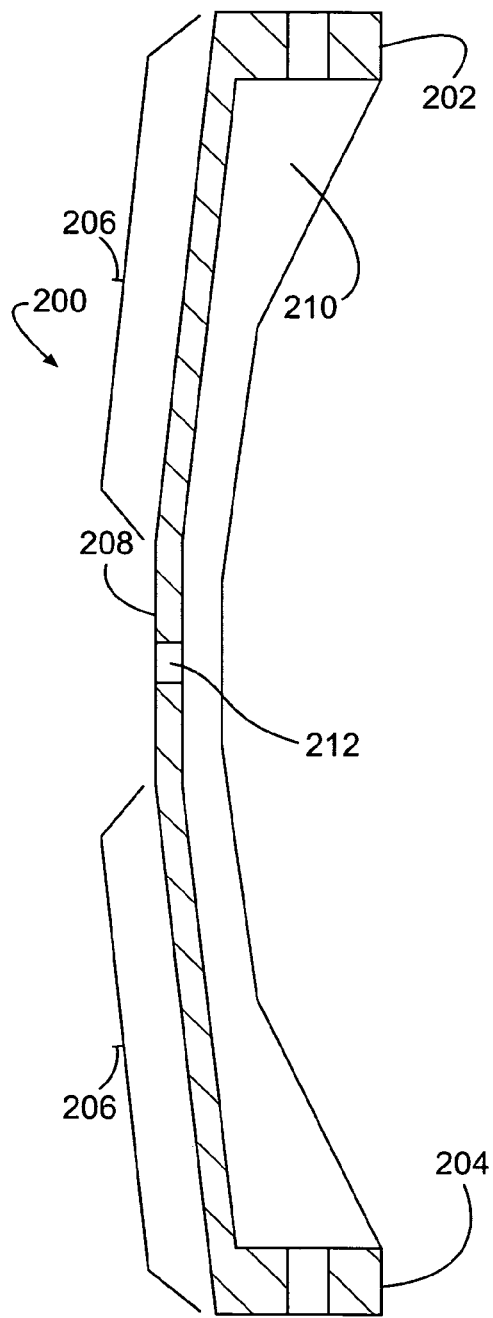
FIG. 6 is a pictorial cross-sectional view of the mounting bracket of FIG. 5.

FIGS. 5 and 6 show another exemplary embodiment of a mounting bracket 200 for use in the mounting system 122. FIG. 5 is an isometric view of the bracket 200, and FIG. 6 is a side view shown in cross-section. In this embodiment, the mounting bracket 200 is a single, molded component configured to attach to both the top and bottom plates 124, 126 of the compressor housing 118. Examples of materials that may be used to form the mounting bracket 200 may include cast or molded aluminum, molded polymers, and/or other materials. The mounting bracket 200 includes a top foot 202, a bottom foot 204, arms 206, and a mount face 208.

The arms 206 may be non-parallel and extend from the top and bottom feet 202, 204 toward the mount face 208, providing a bowed appearance, best-seen in FIG. 6. The arms 206 may include ridges 210 at each side, extending radially inward from the bowed arms 206, providing structural support and integrity to the mounting bracket 200.

The mount face 208 may provide a flat, planar surface in the bowed mounting bracket 200 that may be substantially parallel to the longitudinal axis 136 of the compressor 120. In the exemplary embodiment shown, the mount face 208 is disposed generally at a height midway between the top and bottom feet 202, 204, and is disposed at the peak formed by the nonparallel arms 206 and/or the mounting bracket 200. The mount face 208 may include a receiving hole 212 formed therein for connection to the isolation assembly 152.

In yet another exemplary embodiment (not shown) the mounting bracket is a ring or basket extending around the periphery of the shell surface 134. The ring is suspended from the top plate 124 to a height generally around a midpoint of the compressor 120 that, in one embodiment, may correspond to the height of the center of gravity 140 of the compressor 120. Brackets secured to the shell surface 134 may extend and connect to the ring at a connection location. Accordingly, the bottom end 132 of the compressor 120, as well as locations adjacent to the bottom end 132 of the compressor 120 are not directly supported, but may instead be suspended from the connection location.

INDUSTRIAL APPLICABILITY

The compressor assembly 110 disclosed herein may be particularly useful in a mobile environment, such as when used on a vehicle 100. A compressor on a vehicle may be subject to greater vibrations and shock than when used in a non-mobile application. Supporting the compressor 120 about its midsection may aid in the reduction of noise and vibration. The compressor assembly 110 may support the weight of the compressor 120 from a location other than the bottom end 132 of the compressor 120, leaving the bottom unsupported. Doing this may provide increased dampening and may provide easier isolation than systems currently used.

The compressor assembly 110 disclosed herein may also provide access to the top and bottom ends 130, 132 of the compressor 120. By securing the compressor 120 at the shell surface 134, the top and bottom ends 130, 132 may be reserved for connection to pipes for flowing a fluid, such as air or refrigerant. Connecting pipes at the either the top or bottom ends 130, 132 may allow the compressor 120 to operate more efficiently than when the pipes connect to the shell surface 134.

Further, when the mounting system 122 connects to the compressor 120 at a height that substantially corresponds to the center of gravity 140 of the compressor 120, the mounting system 122 may provide increased stability and support, allowing the mounting system 122 to be less robust than may otherwise be required. Accordingly, a weight savings and/or a space savings may be obtained.

Although the compressor assembly 110 is disclosed as being used on an on-highway truck, it should be apparent that the compressor assembly 110 would be equally applicable and equally usable in other mobile environments, including use on other work machines and/or vehicles.

It will be apparent to those skilled in the art that various modifications and variations can be made in the disclosed embodiments without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. A mounting system for supporting a weight of a compressor in a mobile application, the compressor having a top end and a bottom end, the mounting system comprising:
   a housing having a top plate and a bottom plate, the top plate being disposed a distance above the bottom plate;
   a mounting bracket connected to the top plate and the bottom plate; and
   an isolation assembly disposed on the mounting bracket and configured to connect to the compressor at a connecting location below the top end and above a location at or adjacent to the bottom end of the compressor, the isolation assembly being configured to support the weight of the compressor at the connecting location without the compressor being supported adjacent to its bottom end.

2. The mounting system of claim 1, wherein the isolation assembly is disposed at about a midpoint of the height of the mounting bracket.

3. The mounting system of claim 1, wherein the mounting bracket includes nonparallel arms extending from opposing ends toward the isolation assembly.

4. The mounting system of claim 1, wherein the mounting bracket includes a mount face forming a flat surface configured to connect to the isolation assembly.

5. The mounting system of claim 1, wherein the isolation assembly includes:
   a weld nut configured to be fixedly secured to the compressor;
   a securing fastener for fastening to the weld nut and to the mounting bracket; and
   an isolator bushing disposed between the securing fastener and the mounting bracket.

6. A compressor assembly, comprising:
   a compressor having a top end, a bottom end, a shell surface, and a longitudinal axis extending through the top and bottom ends; and
   a mounting system in contact with the shell surface of the compressor at a connecting location below the top end and above locations at or adjacent to the bottom end of the compressor, the mounting system being configured to support the weight of the compressor at the connecting location without the compressor being supported adjacent to its bottom end.

7. The compressor assembly of claim 6, wherein the mounting system is in contact with the shell surface of the compressor a height along the longitudinal axis that generally corresponds to a center of gravity.

8. The compressor assembly of claim 6, wherein the mounting system is in contact with the shell surface of compressor at a height along the longitudinal axis that generally corresponds to a compressor midpoint.

9. The compressor assembly of claim 6, wherein the mounting system includes:
   a mounting bracket; and
   a securing fastener projecting substantially perpendicular to the longitudinal axis of the compressor, the securing fastener being configured to mechanically connect the shell surface to the mounting bracket and support the weight of the compressor.

10. The compressor assembly of claim 9, wherein the mounting system includes a compressor fastener fixedly secured to the shell surface of the compressor, the compressor fastener being configured to receive the securing fastener.

11. The compressor assembly of claim 6, wherein the mounting system includes a mounting bracket having nonparallel arms extending from a mount face with a receiving hole formed therein.

12. The compressor assembly of claim 6, wherein the mounting system includes:
    a mounting bracket configured to extend between a top and a bottom of a compressor housing; and
    an isolation assembly connecting the mounting bracket and the compressor, the isolation assembly including an isolator bushing disposed between the compressor and the mounting bracket.

13. The compressor assembly of claim 6, wherein the mounting system includes:
    a mounting bracket configured to extend between a top and a bottom of a compressor housing and to support the weight of the compressor; and
    an isolation assembly connected to the mounting bracket, the isolation assembly including an isolator bushing configured to dampen vibration to the compressor.

14. The compressor assembly of claim 6, wherein the mounting system includes three mounting brackets substantially equally spaced about the shell surface of the compressor.

15. The compressor assembly of claim 6, including a pipe connector disposed on at least one of the top and bottom ends of the compressor.

16. A vehicle, comprising:
    a frame;
    an engine supported by the frame;
    a compressor assembly supported by the frame including
       an air-conditioning compressor having a top end, a bottom end, a shell surface, and a longitudinal axis extending through the top and bottom ends, and
       a mounting system in contact with the shell surface of the compressor at a connecting location that is at a height along the longitudinal axis that substantially corresponds to the center of gravity of the compressor, the mounting system being configured to support the weight of the compressor at the connecting location without the compressor being supported adjacent to its bottom end.

17. The vehicle of claim 16, including a compressor housing having a top plate, a bottom plate, and walls connecting the top and bottom plates, wherein the mounting system includes
    a mounting bracket configured to extend between the top and bottom plates; and
    an isolation assembly connecting the mounting bracket and the compressor, the isolation assembly including an isolator bushing disposed between the compressor and the mounting bracket.

18. The vehicle of claim 17, wherein the isolator bushing is configured to dampen vibration between the mounting bracket and the compressor.

19. The vehicle of claim 16, wherein the mounting system includes three mounting brackets substantially equally spaced about the shell surface of the compressor.

20. The vehicle of claim 16, wherein the mounting system includes a mounting bracket having nonparallel arms extending from a mount face with a receiving hole formed therein.

* * * * *